United States Patent
Xuan et al.

(10) Patent No.: US 6,320,728 B1
(45) Date of Patent: Nov. 20, 2001

(54) LASER TEXTURED MAGNETIC SURFACE MICRO-RIDGES/GROOVES TO ENHANCE MAGNETIC RECORDING PERFORMANCE

(75) Inventors: Jialuo Jack Xuan, Milpitas; Xiaohua Shel Yang, Fremont; Chung-Yuang Shih, Cupertino; Taesun E. Kim, San Jose, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/311,358

(22) Filed: May 13, 1999

Related U.S. Application Data

(60) Provisional application No. 60/086,028, filed on May 19, 1998.

(51) Int. Cl.[7] .................................................. G11B 5/82
(52) U.S. Cl. ................................................................. 360/135
(58) Field of Search ................................................. 360/135

(56) References Cited

U.S. PATENT DOCUMENTS

| | | | |
|---|---|---|---|
| 4,939,614 | * 7/1990 | Shirakura et al. | 360/135 |
| 4,996,622 | * 2/1991 | Takatsuki et al. | 360/135 |
| 5,070,425 | * 12/1991 | Inumochi | 360/135 |
| 5,353,182 | * 10/1994 | Nakamura et al. | 360/104 |
| 5,388,020 | * 2/1995 | Nakamura et al. | 360/135 |
| 5,478,622 | * 12/1995 | Nakamura et al. | 428/65.6 |
| 5,822,211 | * 10/1998 | Barenboim et al. | 364/474.08 |
| 5,825,596 | * 10/1998 | Hikosaka et al. | 360/135 |
| 5,870,265 | * 2/1999 | Boutaghou | 360/135 |
| 5,909,341 | * 6/1999 | Hikosaka et al. | 360/104 |
| 5,912,791 | * 6/1999 | Sundaram et al. | 360/135 |
| 6,093,472 | * 7/2000 | Xuan et al. | 428/141 |
| 6,103,404 | * 8/2000 | Ross et al. | 428/600 |

FOREIGN PATENT DOCUMENTS

| | | |
|---|---|---|
| 6-103563 | * 4/1994 | (JP) . |
| 8-235580 | * 9/1996 | (JP) . |
| 8-329453 | * 12/1996 | (JP) . |

* cited by examiner

Primary Examiner—William Klimowicz
(74) Attorney, Agent, or Firm—McDermott, Will & Emery

(57) ABSTRACT

A magnetic data storage medium is provided that has a substrate surface with regularly spaced, continuous ridges and grooves thereby to enhance the magnetic layer crystallization orientation. Data storage tracks extend longitudinally along the ridges, the grooves between adjacent ridges providing separation between data tracks on either side of each ridge. To form the substrate surface a focused laser beam is continuously applied to the substrate in a path of generally circumferential direction on the disk surface between inner and outer radii of a data storage zone while the substrate is rotated at a relatively constant first speed and the focused beam is moved radially at a relatively constant second speed.

10 Claims, 4 Drawing Sheets

LASER TEXTURED MAGNETIC SURFACE MICRO-RIDGES/GROOVES TO ENHANCE MAGNETIC RECORDING PERFORMANCE

RELATED APPLICATIONS

This application claims priority from provisional patent application Ser. No. 60/086,028, filed May 19, 1998, the entire disclosure of which is hereby incorporated by reference herein.

This application contains subject matter that is related to subject matter disclosed in U.S. patent application Ser. No. 09/125,152, filed Aug. 10, 1998, now U.S. Pat. No. 6,147,322, the entire disclosure of which is incorporated herein by reference.

TECHNICAL FIELD

The present invention relates to the recording, storage and reading of magnetic data, particularly rotatable magnetic recording media, such as thin film magnetic disks having textured surfaces for cooperating with magnetic transducer heads. The invention has particular applicability to high density magnetic recording media for exhibiting low noise.

BACKGROUND

Magnetic disks and disk drives are conventionally employed for storing data in magnetizable form. Typically, one or more disks are rotated on a central axis in combination with data transducer heads positioned in close proximity to the recording surfaces of the disks and moved generally radially with respect thereto. Magnetic disks are usually housed in a magnetic disk unit in a stationary state with a magnetic head having a specific load elastically in contact with and pressed against the surface of the disk.

In operation, the magnetic disk is normally driven by the contact start stop (CSS) method, wherein the head begins to slide against the surface of the disk as the disk begins to rotate. Upon reaching a predetermined high rotational speed, the head floats in air at a predetermined distance from the surface of the disk due to dynamic pressure effects caused by the air flow generated between the sliding surface of the head and the disk. During reading and recording operations, the transducer head is maintained at a controlled distance from the recording surface, supported on an air bearing of air as the disk rotates. The magnetic head unit is arranged such that the head can be freely moved in the radial direction of the disk in this floating state allowing data to be recorded on and retrieved from the surface of the disk at a desired position.

Upon terminating operation of the disk drive, the rotational speed of the disk decreases and the head begins to slide against the surface of the disk again and eventually stops in contact with and pressing against the disk. Thus, the transducer head contacts the recording surface whenever the disk is stationary, accelerated from a stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

During reading and recording operations, it is desirable to maintain each transducer head as close to its associated recording surface as possible, i.e., to minimize the flying height of the head without contacting or damaging the data storage portion of the disk. This objective becomes particularly significant as the areal data recording density increases.

Thus, a smooth recording surface is preferred, as well as a smooth opposing surface of the associated transducer head, for permitting the head and the disk to be positioned in close proximity, with an attendant predictability and consistency of behavior of the air bearing supporting the head. However, if the head surface and recording surface are too flat, the precision match of these surfaces gives rise to excessive stiction and friction during the start up and stopping phases, thereby causing wear to the head and recording surfaces eventually leading to what is referred to as "head crash." Thus, there are competing goals of reducing head/disk friction and minimizing transducer flying height.

In order to satisfy these competing objectives, the recording surfaces of magnetic disks are conventionally provided with a roughened surface to reduce the head/disk friction by techniques referred to as "texturing." Conventional texturing techniques involve polishing the surface of a disk substrate to provide a texture thereon prior to subsequent deposition of layers, such as an underlayer which is typically chromium or a chromium-alloy, a magnetic layer, a protective overcoat which typically comprises carbon, and a lubricant topcoat, wherein the textured surface on the substrate is intended to be substantially replicated on the outer surface of the magnetic disk.

The escalating requirements for high areal recording density impose increasingly greater requirements on thin film magnetic media in terms of coercivity, squareness, low medium noise and narrow track recording performance. In addition, increasingly high density and large-capacity magnetic disks require increasingly small flying heights, i.e., the distance by which the head floats above the surface of the disk in the CSS drive. The requirement to further reduce the flying height of the head imposed by increasingly higher recording density and capacity render it particularly difficult to satisfy the requirements for controlled texturing to avoid head crash.

Texture on magnetic recording media surfaces has been required, also, in data storage zones to orient the crystallization of the magnetic layer along circumferential lines to improve the signal-to-noise ratio and other magnetic performance. Conventional techniques comprise a mechanical operation, such as polishing. One such technique is to apply slurries with coolant for scratching the substrate surface. The slurries are inserted between a tape and the substrate with a certain normal force applied to the tape while the disk is in relative motion to the tape. The substrate surface is scratched by the slurry particles during this process, the resulting scratched lines known as surface texture lines. Because of the random of slurry particle sizes, these texture lines are randomly spaced with different scratch widths and depths. Also, because of the inconsistency of slurry concentration supplied to each disk, the scratch line width and depth vary from disk to disk. With conventional mechanical texturing techniques, it is extremely difficult to provide a clean textured surface due to debris formed by mechanical abrasions. Moreover, the surface inevitably becomes scratched during mechanical operations, which contributes to poor glide characteristics and higher defects. Such relatively crude mechanical polishing, with attendant non-uniformities and debris, does not provide a surface with an adequately specular finish or with adequate microtexturing to induce proper crystallographic orientation of a subsequently deposited magnetic layer on which to record and read information, i.e., a data zone.

FIG. 1 is illustrative of surface profiles obtained from typical mechanical texturing techniques. Asperities between scratch lines which are created by the mechanical texturing method vary greatly in size of up to the order of 50Å high on a surface of roughness average Ra of only about 5Å. The surface profile is a relatively random profile, with no specified number of peaks, nor defined heights of the bumps and depths of the valleys. As recording density requirements continue to increase, the size of each magnetic bit becomes smaller. As a result of random spacing of texture lines and random unacceptable scratch depths, more defects are found during magnetic testing.

An alternative technique to mechanical texturing comprises the use of a laser light beam focused on an upper surface of a nonmagnetic substrate. See, for example, Ranjan et al., U.S. Pat. No. 5,062,021, in which an NiP plated Al substrate is polished to a specular finish, and then the disk is rotated while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, Nov. 1995. See, also, U.S. Pat. Nos. 5,550,696 and 5,595,791.

The above-identified copending application Ser. No. 09/125,152, now U.S. Pat. No. 6,147,322, applies laser texturing to obtain an ultra-fine pattern with elongated asperities having low asperity height. While there are no deep valleys on the media surface, the elongated asperities are randomly elongated, created by a laser beam that is randomly modulated and focused on the data storage media surface. Although asperity elongation provides a more limited randomness in the circumferential direction, nonuniformity in height imposes negative effects on signal-to-noise ratio and magnetic performance as data density becomes increasingly greater.

Accordingly, there exists a need for a magnetic recording medium having data storage surfaces configured to accommodate the decrease in bit size concomitant with higher density storage. Such a configuration should provide an acceptable limit in the number of bits that are disqualified or missing in magnetic testing, which in the prior art are due to random spacing of deep scratches or texture lines.

A further need exists for a laser micro-machining technique to form such high density storage surfaces in a practical manner.

SUMMARY OF THE INVENTION

The present invention fulfills the aforementioned needs. An advantage of the present invention is that a magnetic data storage medium is provided that has a substrate surface with regularly spaced, continuous ridges and grooves thereby to enhance the magnetic layer crystallization orientation. With such a configuration, a further advantage of the present invention is that data tracks can extend longitudinally along the ridges, the grooves between adjacent ridges providing separation between data tracks on either side of each ridge.

An additional advantage of the present invention is that spacing between adjacent ridges can be made greater than two data track widths so that each of the two sloped sides of each ridge can accommodate a data storage track.

A further advantage of the invention is a method for forming a textured data zone on a magnetic recording disk in which a focused laser beam is continuously applied to a substrate in a path of generally circumferential direction on the disk surface between inner and outer radii of a data storage zone. Application of the laser beam occurs while the substrate is rotated at a relatively constant first speed and the focused beam is moved radially at a relatively constant second speed, significantly slower. The resulting configuration is a continuous grooved structure in which a plurality of generally parallel and circumferential continuous ridges are separated by grooves. Upon this surface is then sequentially deposited a magnetic layer, a protective overcoat and a lubricant topcoat, the textured surface of the substrate surface being substantially replicated on subsequently deposited layers. One or more data storage tracks are then formed in the magnetic layer of each of the resulting ridges.

Additional aspects and advantages of the present invention will become readily apparent to those skilled in this art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
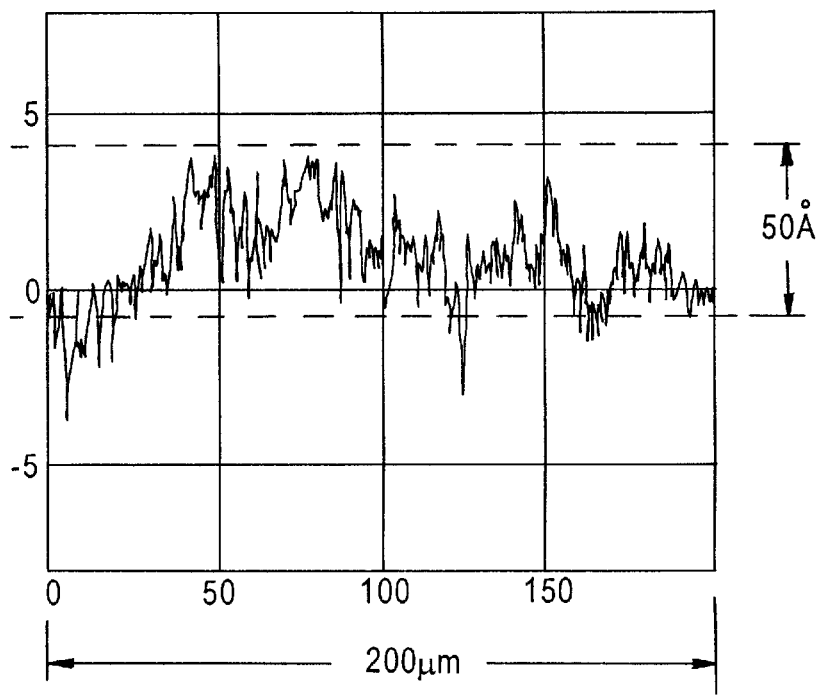
FIG. 1 is an illustration of surface profiles obtained from typical prior art mechanical texturing techniques.
Figure 2:
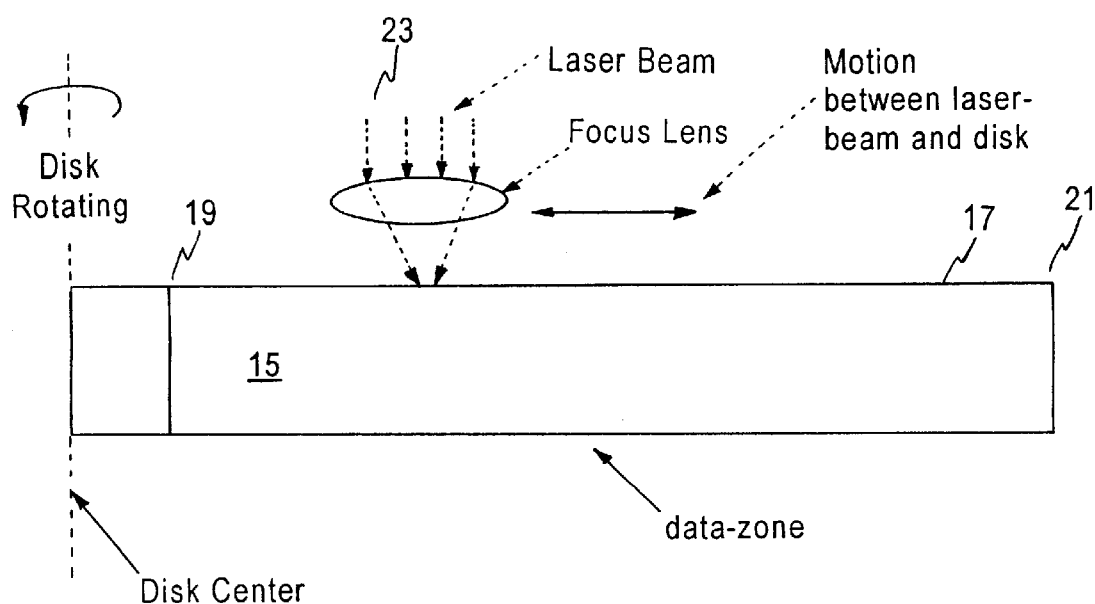
FIG. 2 is a partial schematic diagram that depicts application of a laser beam to a disk substrate subject to relative movement in accordance with the present invention.

FIG. 2 illustrates the use of laser micro-machining techniques to form the substrate surface with regularly spaced ridges and grooves to enhance the magnetic layer crystallization orientation. Disk substrate 15, having upper and lower surfaces, is allocated a data zone 17 between inner radius and outer radius 21, at which one or both substrate surfaces are processed to form data storage areas. Laser beam 23, which may be of a continuous waveform or of a pulsed waveform at a high pulse frequency, is focused to provide accurate heat energy to one of the data zone surfaces while the substrate is rotating and in relative radial movement with respect to the focused laser beam. Either the laser beam generating apparatus or the disk may be driven for radial movement with respect to the other.

The laser beam applies relatively constant energy continuously between the inner and outer data zone radii on the substrate surface. During this application, the speed of rotation of the substrate is maintained constant at a first rotational speed and the radial movement is held relatively constant at a significantly lower lineal second speed. As a result, a continuous groove will form a spiral path through a plurality of revolutions along a circumferential direction throughout the radial extent of the data zone. A continuous ridge is also formed adjacent each side of the groove throughout the spiral path. By maintaining constant the radial and rotational speeds and laser beam power, the groove depth and ridge height can be made uniform. By setting the rotational speed and speed of radial movement at appropriate values, the number of revolutions traversed by the spiral path, and the spacing between portions of radially adjacent portions of the path can be fixed.

Figure 3:
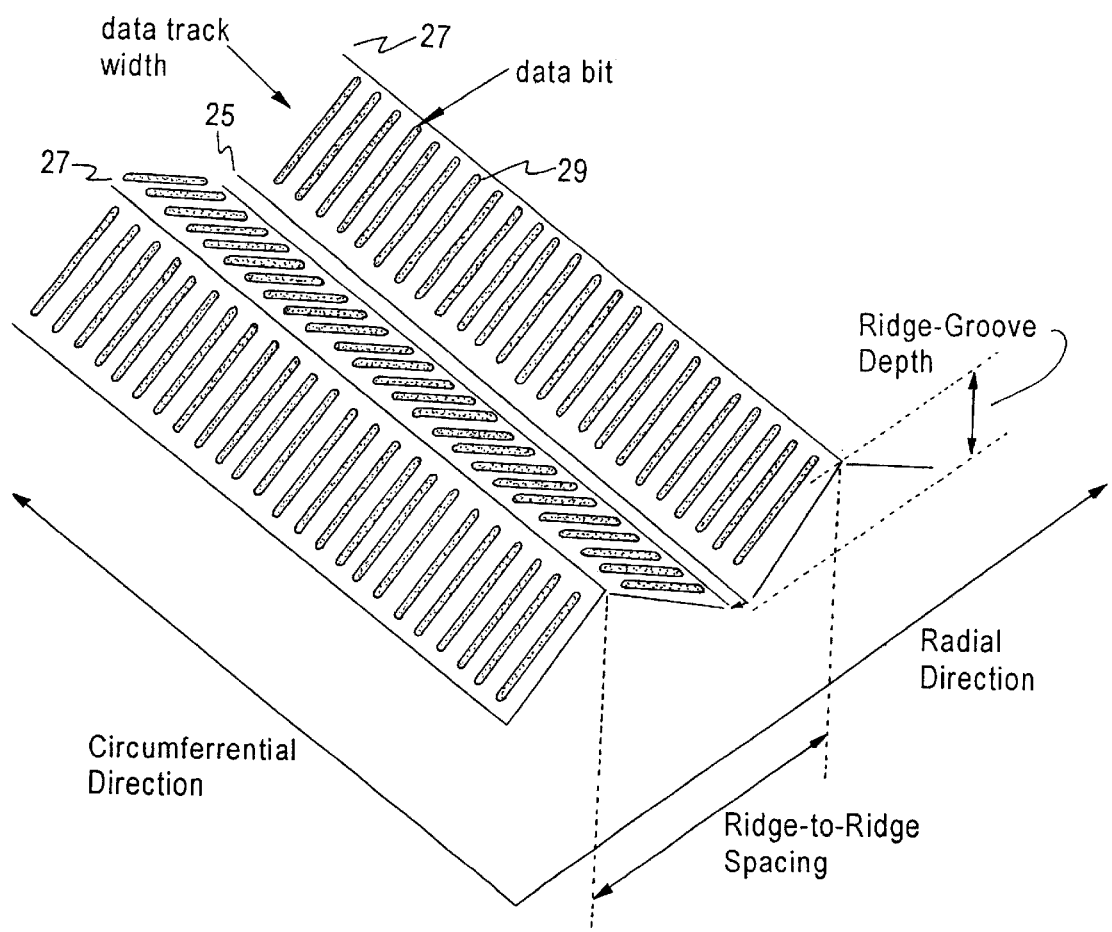
FIG. 3 is a sectional, perspective representation of a substrate processed in accordance with the present invention.

FIG. 3 is an illustration, taken in perspective section, of a portion of the laser textured data zone of the disk substrate. Groove 25 separates ridges 27, the latter forming two sloped surfaces, each of which can accommodate a longitudinal data storage track in the preferred embodiment. Data bits 29 are stored in sequential order along the track. To maximize data storage capacity of the disk, relative radial movement between laser beam and disk is made as slow as possible with respect to rotational movement to obtain a maximum number of grooves, and thus a maximum number of ridges for data storage, without degrading magnetic performance. A microsection of the disk surface, as shown in FIG. 3, thus appears as a parallel configuration of alternating grooves and ridges. The longitudinal direction of FIG. 3, while appearing as one dimension of a perpendicular coordinate system, is actually a circumferential path. It is advantageous that ridge to ridge spacing be made to be more than twice the desired magnetic data track width so that the bottom of each groove can separate the two nearby tracks, and each bit on the same data track will be recorded on a similar surface background. For example, for area density of about 3.2 Gbit per square inch magnetic recording, the track density is 12580 tracks per inch, with track width about 2 $\mu$m, and ridge to groove depth of about 50 Å.

Figure 4:
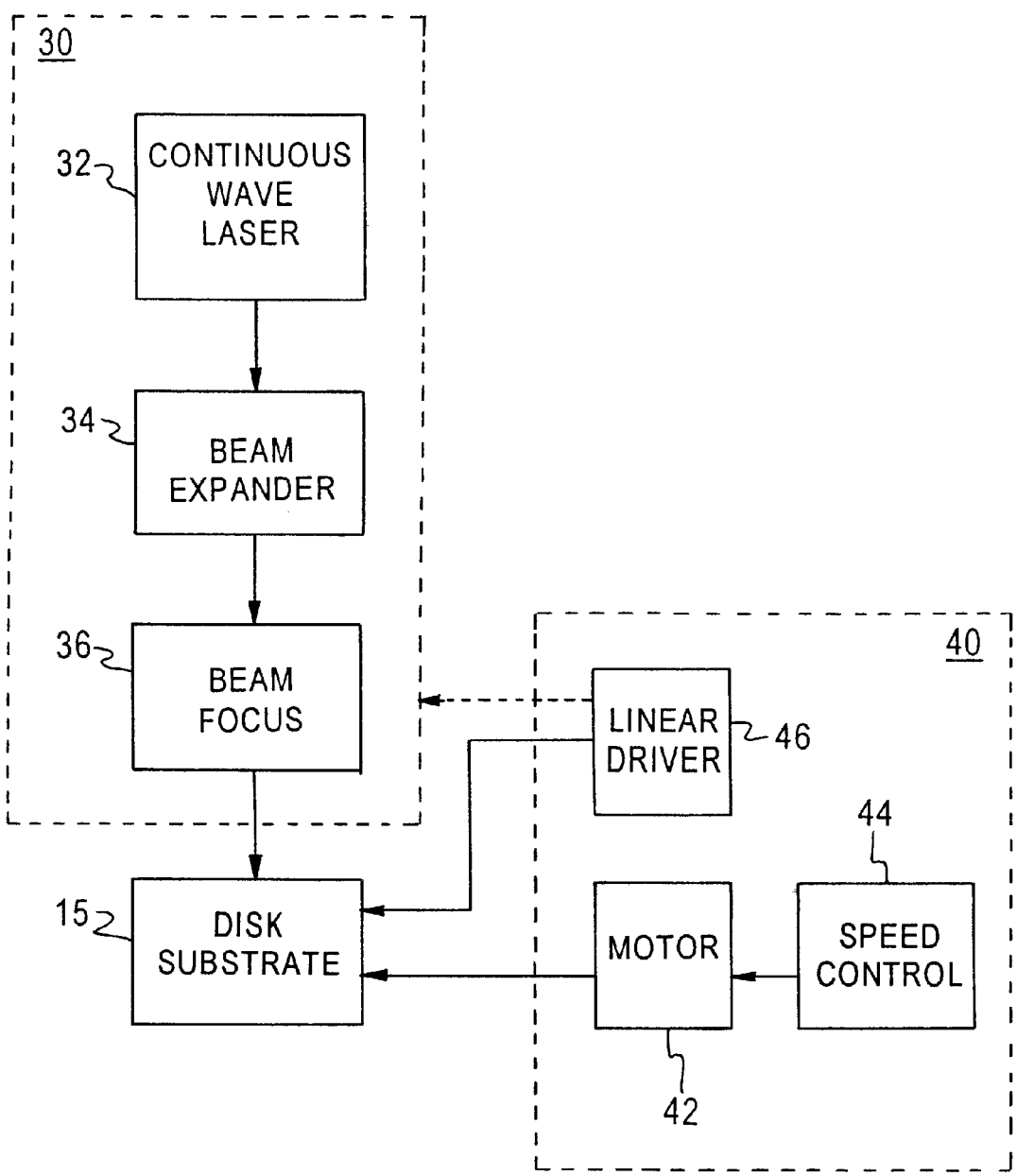
FIG. 4 is a block diagram illustrative of formation of the textured disk surface in accordance with the present invention.

FIG. 4 is a block diagram representing facilitation of the process for performing the surface texturing. Laser beam generator 30 is arranged to apply a continuous, constant energy laser beam to disk substrate 15. Laser beam generator 30 preferably comprises a continuous wave generator having an output applied to beam expander 34, which may comprise a conventional, well known collimator. The expanded beam is focused at block 36 for controlled concentrated application to the disk substrate. Block 36 may comprise a conventional aperture and focusing lens, the latter illustrated in FIG. 2.

The configuration of the path formed on the substrate is under management of movement control block 40, which comprises motor 42 and linear driver 46. The disk substrate may be seated on a spindle (not shown) having a rotational speed driven by motor 42 subject to motor speed control circuit 44. Motor 42 and speed control circuit may comprise any conventional, well known drive unit by which a selected speed may be set and maintained in response to an operator input. Linear driver 46 may comprise, for example, any conventional, well known servomechanism controller for maintaining constant linear motion at a selectable level. While linear driver 46 is illustrated by the solid line connection as driving the substrate for movement relative to the laser beam, alternatively the laser generator can be driven to achieve such relative movement, as shown by the dotted line connection. Reference is made to the copending applications, patents, and publications identified earlier for more detailed description of conventional elements that may be advantageously employed in the laser beam generator 30 and movement control block 40.

Figure 5A:
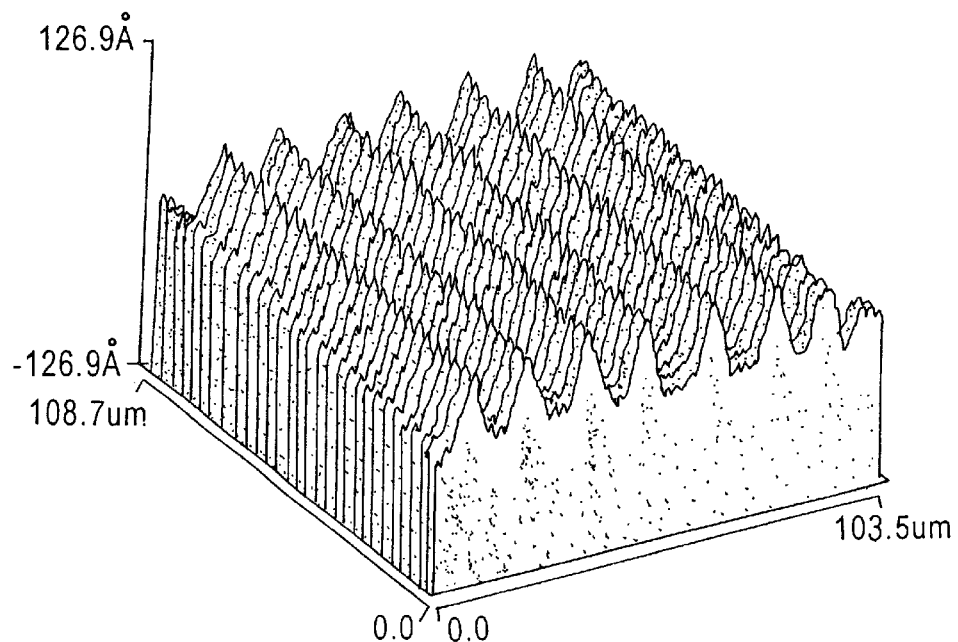
FIGS. 5A and 5B are perspective illustrations of a laser textured disk surface having micro-ridges and micro-grooves formed, respectively, with relatively lower and higher laser power in accordance with the present invention.
Figure 5B:
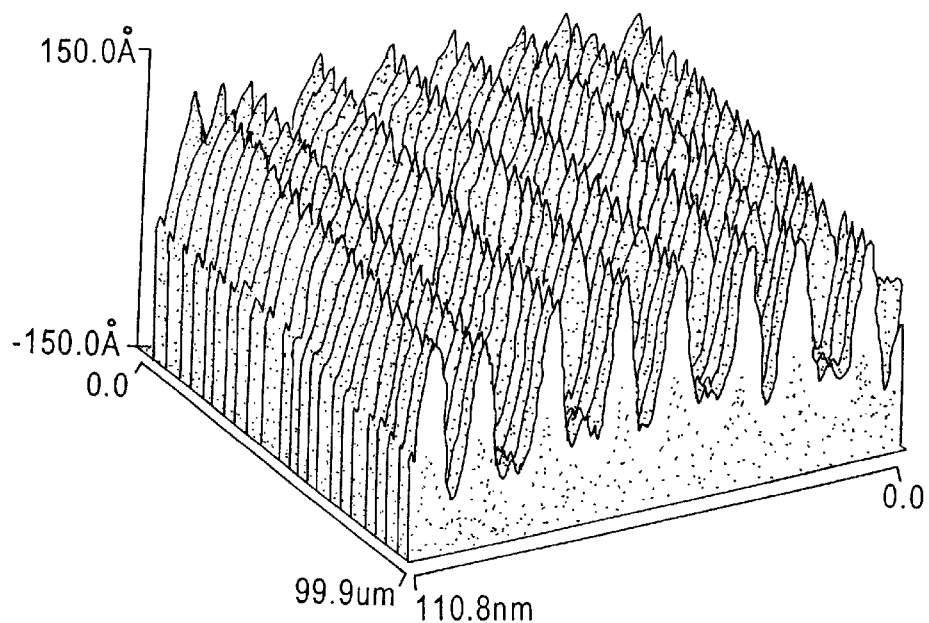

As may be appreciated, the spacing between ridges, the ridge to groove depth, the ridge height, the width of the groove, and the ridge slope are all geometrical parameters, illustrated in FIG. 3, that can be determined by the particular combination of the laser power, relative movement of laser beam and disk, and disk rotational speed employed. An additional factor is the substrate material used. Various combinations of ranges for these factors have been found to produce acceptable results. The substrate material may comprise any material conventionally employed for substrates in manufacturing magnetic recording media, for example, nickel-phosphorus coated aluminum or aluminum alloy upon which a YAG laser having a wavelength of 1064 nm in a CW mode may be applied. The laser power used may be in the range of 1.60 W to 1.82 W with a focused beam diameter of about 2.5 $\mu$m. FIGS. 5A and 5B, are perspective illustrations of a laser textured disk surface having micro-ridges and micro-grooves formed, respectively, with relatively lower and higher laser power in accordance with the present invention. Satisfactory geometric parameters for the textured surface are in a range of about 0.05 $\mu$m to 1.0 $\mu$m spacing from ridge to ridge, with a track width in a range of about 0.05 $\mu$m to 1.0 $\mu$m, and ridge to groove depth in a range of about 20 Å to 100 Å. These parameter ranges have been achieved using disk speeds in a range of about 100 rpm to 800 rpm and radial movement in the range of about 0.001 inches per second (IPS) to 0.010 IPS. Particularly advantageous results were obtained for a range of about 0.2 $\mu$m to 0.5 $\mu$m spacing from ridge to ridge, a track width in a range of about 0.2 $\mu$m to 0.5 $\mu$m, ridge to groove depth in a range of about 30 Å to 50 Å, disk speed in a range of about 300 rpm to 500 rpm and radial movement in the range of about 0.003 IPS to 0.006 IPS.

After formation of the textured surface of the substrate, the magnetic recording medium is completed in a conventional manner, as by sequentially depositing thereon an underlayer, e.g., chromium or chromium alloy, a magnetic layer, a protective overcoat and a lubricant topcoat. The textured surface of the substrate is substantially replicated on the subsequently deposited layers. The magnetic layer on the ridges between the grooves are used to form the data storage tracks.

Only certain embodiments of the invention and but a few examples of its versatility are shown and described in the present disclosure. It is to be understood that the invention is capable of use in various other combinations and environments and is capable of changes or modifications within the scope of the inventive concept as expressed herein.

What is claimed is:

1. A magnetic recording disk comprising a substrate circumferentially bounded about a rotational axis, a surface of the substrate having a laser textured data zone, said data zone having a plurality of continuous ridges having slanted sidewalls formed at regularly spaced intervals and separated from each other by grooves, said ridges having data storage tracks thereon, wherein said data zone comprises an entirety of said surface that extends between an inner radius and an outer radius in the vicinity of the disk circumference, said grooves defining a continuous generally spiral circumferential path extending from said inner radius to said outer radius.

2. A magnetic recording disk as recited in claim 1, wherein said data tracks extend longitudinally along the ridges and the spacing between adjacent ridges is greater than two data track widths, wherein two data storage tracks are contained between adjacent grooves.

3. A magnetic recording disk as recited in claim 2, wherein each of said ridges comprises two sloped sides, each of said sides comprising a data storage track.

4. A magnetic recording disk as recited in claim 1, wherein said spacing between adjacent ridges is in a range from about 0.2 $\mu$m to 0.5 $\mu$m.

5. A magnetic recording disk as recited in claim 4, wherein said surface has a ridge to groove depth in a range from about 30 Å to 50 Å.

6. A magnetic recording disk as recited in claim 1, wherein said data storage tracks have a width in a range from about 0.2 μm to 0.5 μm.

7. A magnetic recording disk as recited in claim 1, wherein said spacing between adjacent ridges is in a range from about 0.05 μm to 1.0 μm.

8. A magnetic recording disk as recited in claim 7, wherein said surface has a ridge to groove depth in a range from about 20 Å to 100 Å.

9. A magnetic recording disk as recited in claim 1, wherein said data storage tracks have a width in a range from about 0.05 μm to 1.0 μm.

10. A magnetic recording disk as recited in claim 1, wherein said disk comprises a nonmagnetic substrate and, sequentially formed thereon, a magnetic layer, a protective overcoat and a lubricant topcoat; wherein the textured surface is provided on the substrate and is substantially replicated on subsequently deposited layers.

* * * * *